United States Patent [19]

Baader

[11] Patent Number: 4,599,679

[45] Date of Patent: Jul. 8, 1986

[54] FUSE BUS BAR ASSEMBLY

[76] Inventor: Edward J. Baader, 232 Stephen La., Springfield, Ohio 45505

[21] Appl. No.: 637,257

[22] Filed: Aug. 3, 1984

[51] Int. Cl.[4] .................... H02B 1/20

[52] U.S. Cl. .................... 361/361; 361/349; 361/355; 361/426; 337/198; 339/147 R

[58] Field of Search .................... 339/22 B, 147 R, 147 P; 337/198; 361/347–349, 355, 357, 360, 361, 426, 430–432, 379, 382, 383

[56] References Cited

U.S. PATENT DOCUMENTS

| | | | |
|---|---|---|---|
| 3,390,309 | 6/1968 | McGrew | 361/426 |
| 3,851,224 | 11/1974 | Ege | 337/256 |
| 3,995,103 | 11/1976 | Gehrs | 361/355 |
| 4,198,107 | 4/1980 | Luke | 361/355 |
| 4,221,455 | 9/1980 | Cairns | 339/147 R |
| 4,258,350 | 3/1981 | Watanabe | 337/198 |
| 4,332,002 | 5/1982 | Yamaguchi | 361/432 |

OTHER PUBLICATIONS

*Packard Electric*, "Auto Fuse Block—A New Idea in Energy Distribution Systems", May 1982, brochure.

*Primary Examiner*—G. P. Tolin

*Attorney, Agent, or Firm*—David H. Semmes; Warren E. Olsen

[57] ABSTRACT

Fuse panel or bus bar assemblies for supporting a plurality of fuses within an automotive electrical system. The bus bar assembly is characterized by its rugged simplicity, enabling the simultaneous support of as many as 20 fuses. A non-conductive housing is provided for support of a pair of metallic bus bars, each bus bar having a plurality of downwardly bent tangs defined in its sides. The bus bars are mated 180° out-of-phase and fitted together, such that in the individual pairs the downwardly bent tangs define a seat for the fuse blades. Adjacent electrical terminal receptacles are provided within the housing such that the fuse blades may contact the appliance terminal simultaneously with contact of the pairs of downwardly bent tangs.

15 Claims, 15 Drawing Figures

FUSE BUS BAR ASSEMBLY

BACKGROUND OF THE INVENTION

1. Field of the Invention

Fuse panels or assemblies for supporting fuses in automotive electrical system.

2. Description of the Prior Art:

McGREW—U.S. Pat. No. 3,390,309

EGE—U.S. Pat. No. 3,851,224

WATANABE—U.S. Pat. No. 4,258,350

Comments are being submitted separately in an Information Disclosure Statement.

SUMMARY OF THE INVENTION

According to the present invention there is eliminated the conventional necessity for splicing of appliance fuses to a battery lead. Applicant has provided a fuse bar assembly which is capable of removably supporting 20 fuses 100 amps at 12 volts D.C.

According to applicant's invention, a non-conducting housing includes a platform support upon which a pair of metallic bus bars are supported. The bus bars have a plurality of downwardly bent tangs in the periphery and are mated 180° out-of-phase, such that adjacent pairs of downwardly bent tangs define a resilient seat for electrical contact with a fuse blade.

An adjacent electrical terminal receptacle is provided for each pair of tangs. A non-conducting cover may be seated on top of the bus bars and secured to the housing as a protection and ventilation feature. The individual fuses may then be seated simultaneously in the pairs of downwardly bent tangs and the adjacent electrical terminal receptacle.

Figure 1:
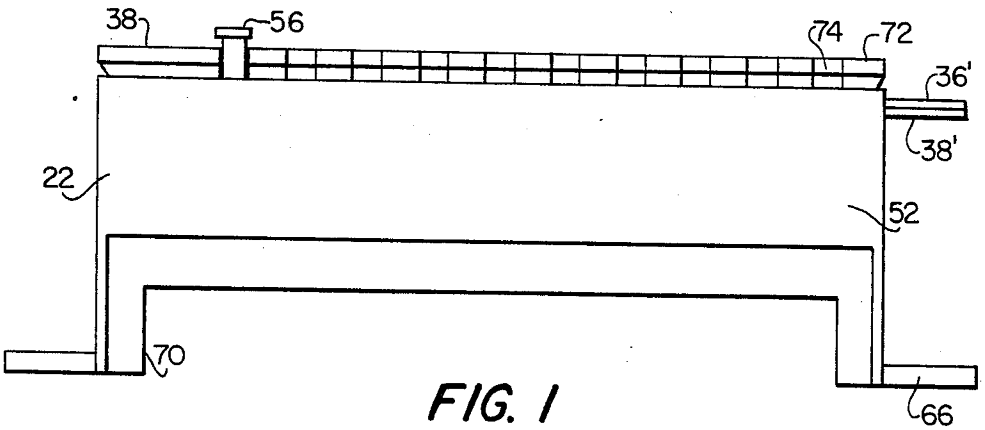
FIG. 1 is a side elevation of the fuse bus bar assembly with a conventional fuse 56 mounted therein.
Figure 2:
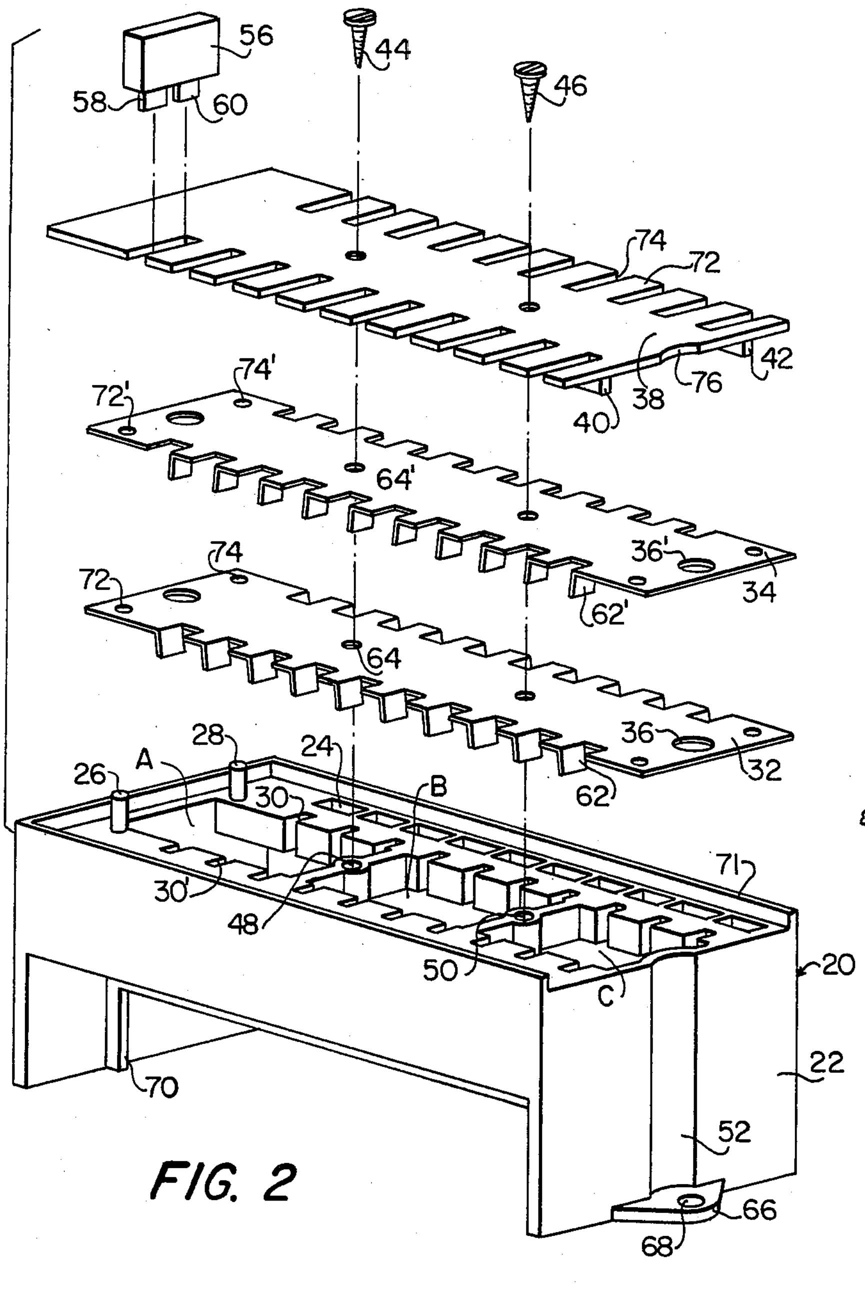
FIG. 2 is an exploded view of the housing, pair of bus bars, cover and fuse.
Figure 5:
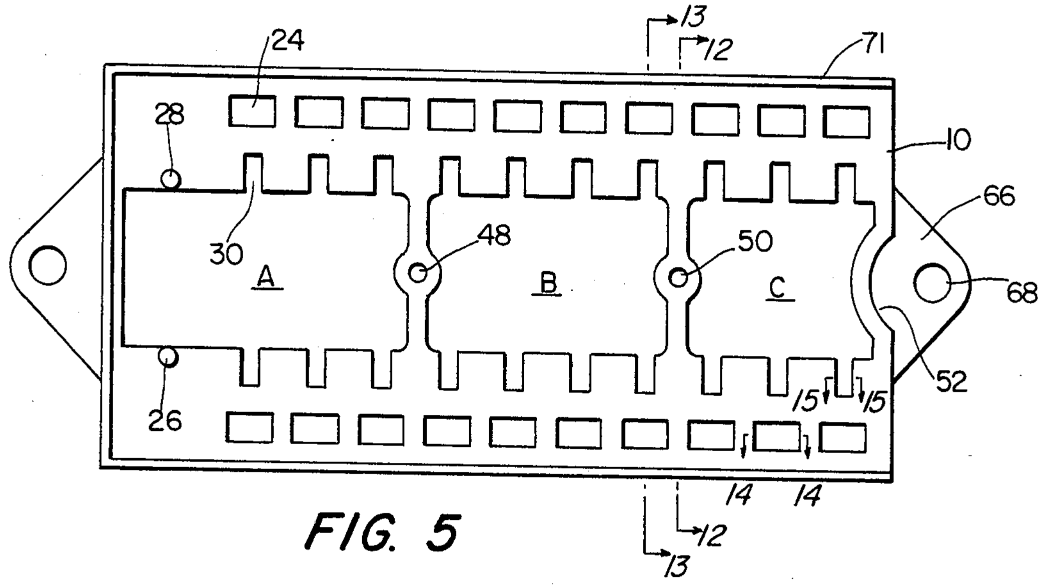
FIG. 5 is a top plan of the housing, showing the outer appliance terminal receptacles and the inner tang support slots.
Figure 6:
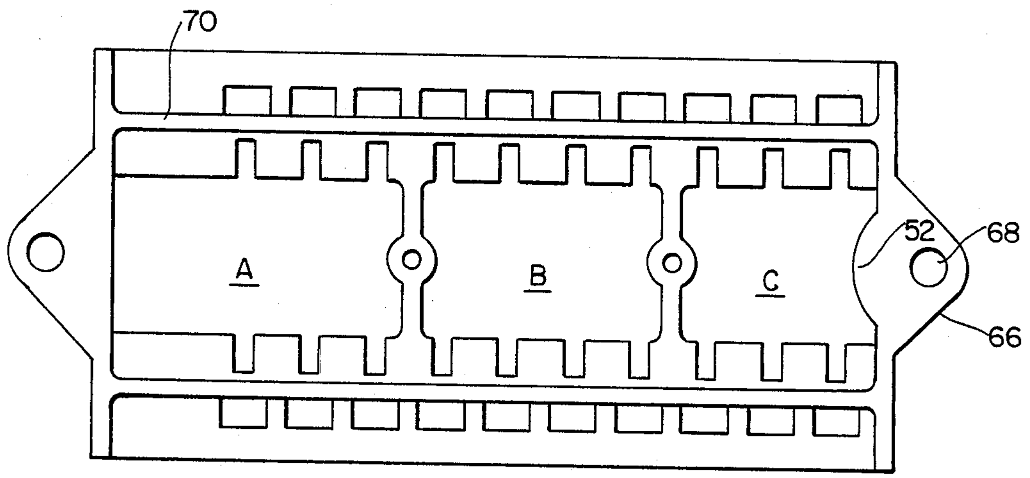
FIG. 6 is a bottom plan, thereof.

DESCRIPTION OF THE PREFERRED EMBODIMENTS:

In FIGS. 1 and 2, the bus bar assembly 20 is indicated as having non-conducting housing 22 defining a plurality of electrical terminal support receptacles 24, a pair of alignment pins 26 and 28 for engagement with corresponding alignment holes 64, 64'; in metallic bus bars 32, 34. Housing 22 includes individual tang support slots 30, 30', adjacent each electrical terminal receptacle 24, as well as lateral rigidizing ribs 48 and 50, defining ventilation areas A, B, and C, as illustrated in FIGS. 5 and 6.

Bus bars 32 and 34 include a plurality of downwardly bent tangs 62, 62', as well as medial aligning apertures 64.

Figure 4:
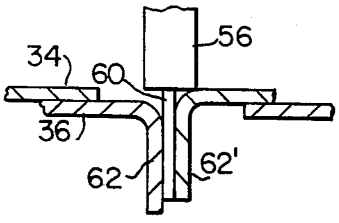
FIG. 4 is an enlarged fragmentary elevation, partially in section, showing the fuse blade in contact with a pair of downwardly bent tangs of the superposed bus bars.

As particularly shown in FIGS. 2 and 4, bus bars 32, 34 are mated 180° out-of-phase, such that their tangs 62, 62' abut each other as a resilient seat for one blade 60 of conventional fuse 56. The pairs of downwardly bent tangs are seated within recesses 30, 30'. The entire assembly may be secured by insulating cover 38 having peripheral ribs 72 which define fuse housing recesses 74, aligned with the individual tang support slots 30 and terminal support receptacle 24. The entire assembly may be secured by threaded bolts or screws, 44, 46 engaging the apertures 48 and 50 in the lateral rigidizing ribs.

Housing 22 may include, also, a rigidizing rib 70 extending between the housing ends inwardly of the tang support slots 30. Also, housing 22 may be concavely formed at one end 52 as an assistance in handling a battery lead lug and an outer securement lug or ear 66 which may have aperature 68 for attachment to a suitable base.

Figure 3:
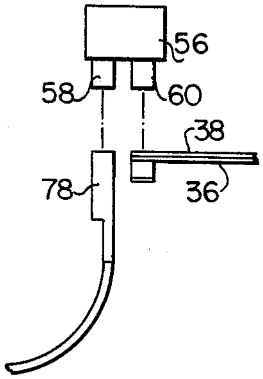
FIG. 3 is a fragmentary exploded view of the fuse contactable with a pair of downwardly bent tangs 36, 38 and the electrical terminal 78.

As illustrated in FIG. 3 the individual fuses 56 including blades 58 and 60 may be fitted, respectively, in the pairs of downwardly bent tangs 36, 38 seated in recess 30 and, also, in the electrical terminal 78, seated within receptacle 24.

Figure 7:
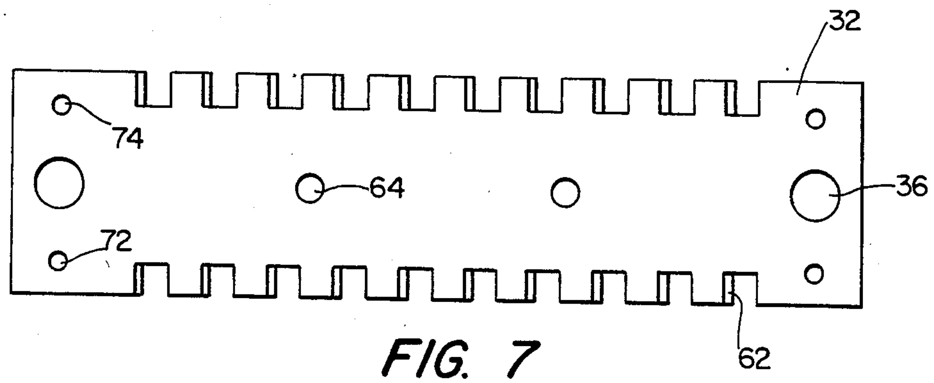
FIG. 7 is a top plan of an individual bus bar.
Figure 8:
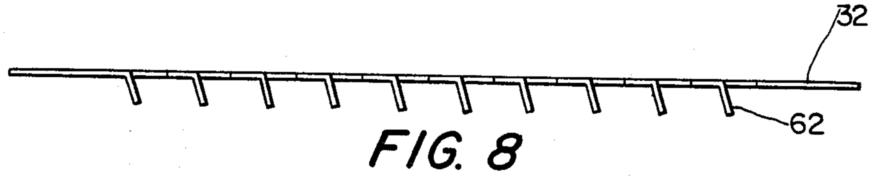
FIG. 8 is a side elevation of the bus bar.
Figure 9:
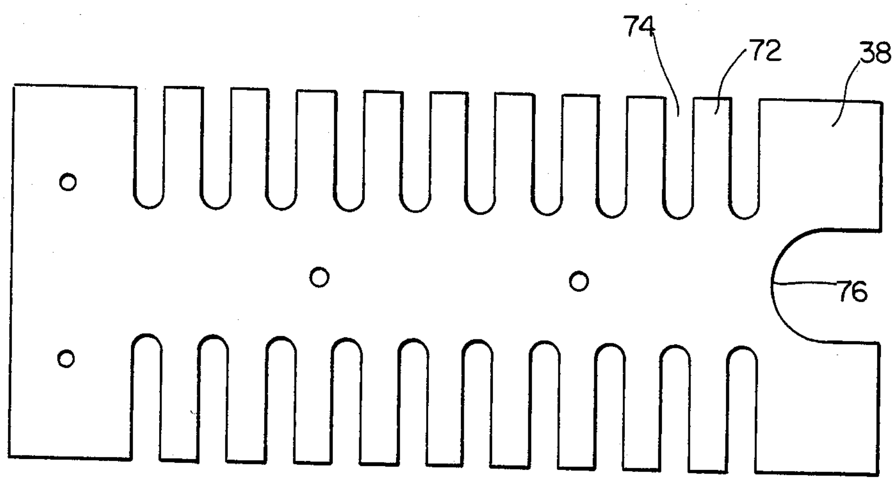
FIG. 9 is a top plan of the protective cover.
Figure 10:
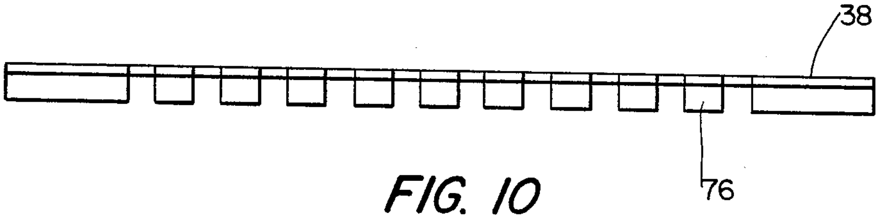
FIG. 10 is a side elevation of the cover.
Figure 11:
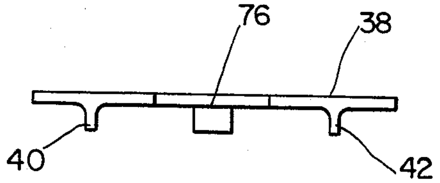
FIG. 11 is an end elevation of the cover.
Figure 12:
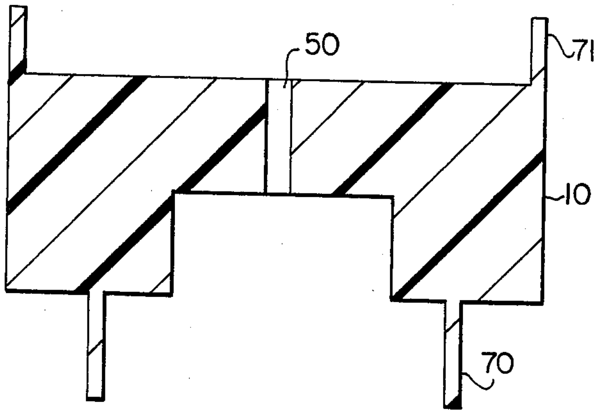
FIG. 12 is a transverse section, taken along section line 12—12 of FIG. 5 and showing the lateral rigidizing rib.

As illustrated in FIGS. 2 and 7, the individual bus bars may have an aperture 36 for securement to a battery connection. This portion of the bus bar extends outwardly of the housing, as illustrated in FIG. 1.

Figure 13:
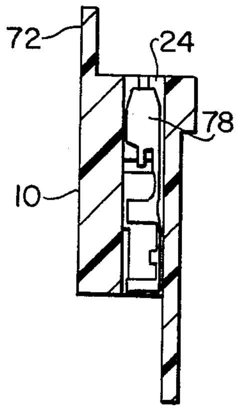
FIG. 13 is a transverse section of the electrical terminal support cavity or receptacle, taken along section line 13—13 of FIG. 5.
Figure 14:
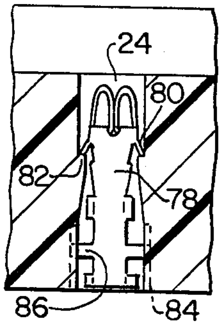
FIG. 14 is a fragmentary longitudinal section, taken along section line 14—14 of FIG., showing the electrical end terminal in place.
Figure 15:
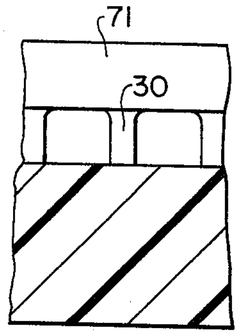
FIG. 15 is a fragmentary longitudinal section, taken along section line 15—15 of FIG. 5, showing the individual bent tang support slots.

In FIG. 13, an individual electrical terminal 78, for example, an appliance terminal, is shown positioned within receptacle 24. Receptacle 24 includes an upper support shoulder 82 engageable with the outwardly extending ears 80 of terminal 78. Also, receptacle 24 may include a pair of lower vertical slots 84 engageable with the terminal 78 lateral stabilizing fins 86.

Housing 22 may include an outer peripheral bead or shoulder 73. Shoulder 73 may be configured to include a plurality of recesses which correspond to the cover recesses 74 for support of the individual fuse bodies, as illustrated in FIG. 1. Also, housing cover 38 may include a pair of longitudinally extending strengthening ribs 40, 42 which define a vertical support for the cover, such that cover 38 may be raised above the bus bars 32, 34 as a ventilation assistance. Cover 38 may include an end concavity alignable with end concavity 52, configured in housing 22.

As will be apparent, the present construction eliminates the necessities for the time consuming and expensive splicing of the battery side of the fuses together either by soldering or terminating along a battery wire. According to the present construction, as many as 20 fuses may be fed off a single bus bar which may be simply and easily stamped. Bus bars 32 and 34 are identically manufactured by stamping and downwardly bending of the individual tangs 62. The fuse blade seat is provided by mating the bus bars 180° out-of-phase and seating within the housing support slot. The economies and advantages of this rugged and simple construction are manifest.

I claim:

1. A fuse bar bus assembly for use in electrical systems employing fuses comprising:

a. a non-conducting housing including a support platform for a pair of bus bars and a receptacle support for a plurality of electrical terminals;

b. a pair of metallic bus bars supported in said housing on said support platform, each bus bar having a battery contact portion and a plurality of downwardly bent tangs, said bus bars being mated 180° out-of-phase with tangs from one bus bar abutting with tangs from the other bus bar and thereby forming adjancent pairs, such that said adjacent pairs of downwardly bent tangs define resilient seats for electrical contact with fuse blades; and c. a cover for said pair of bus bars, said cover being seated on top of said bus bars in said housing.

2. A fuse bar bus assembly as in claim 1, said cover including a pair of longitudinally extending rigidizing ribs contacting said housing support platform adjacent said bus bars.

3. A fuse bar bus assembly as in claim 1, said housing further including:

i. A recessed upper platform as a support for said bus bars; and ii. A plurality of vertically extending tang support slots engaged with said pairs of downwardly bent tangs.

4. A fuse bar bus assembly as in claim 3, said housing further including:

iii. A plurality of appliance terminal receptacles adjacent each of said tang support slots and engageable with a fuse contact blade.

5. A fuse bar bus assembly as in claim 4, said housing further including:

iv. Alignment pins extending vertically with respect to said platform support and mating with corresponding alignment recesses in said pair of bus bars.

6. A fuse bar bus assembly as in claim 5, said cover further including a plurality of peripheral recesses configured complementally with a fuse body, each peripheral recess being aligned with a pair of downwardly bent tangs and its adjacent appliance terminal receptacle.

7. A fuse bar bus assembly as in claim 6, said cover rigidizing ribs being of a height to support said cover apart from said bus bars and said housing as a ventilation aid.

8. A fuse bar bus assembly as in claim 7, said housing having at least one lateral rigidizing rib extending between its sides beneath said platform support, said rib having an alignment hole engageable with an alignment member extensible through said cover and said pair of bus bars.

9. A fuse bar bus assembly as in claim 8, said housing further including:

v. a raised outer shoulder extending above said support flatform.

10. A fuse bar bus assembly as in claim 9, said battery contact portion in said pair of metallic bus bars extending outwardly of one end of said housing and said housing being configured concavely adjacent said battery contact portion.

11. A fuse bar bus assembly as in claim 10, said housing further including:

vi. a lower rigidizing rib extending between the ends of said housing and inwardly of said appliance terminal receptacle.

12. A fuse bar bus assembly as in claim 11, each housing appliance terminal receptacle further including:

vii. an upper ledge engageable with the ears of an appliance terminal supported therein, and viii. a lower slot engageable with an appliance terminal stabilizing rib.

13. A fuse bar bus assembly as in claim 12, said housing further including:

ix. at least one lug extending outwardly from said base as an attachment ear.

14. A fuse bar bus assembly as in claim 13, said housing tang support slots and appliance terminal receptacle extending through said housing and said housing defining vertical ventilation spaces adjacent said lateral support rib and a horizontal ventilation space beneath said lower rigidizing rib.

15. A fuse bar bus assembly as in claim 14, each said bus bar including at least 20 pairs of downwardly bent tangs, so as to support at least 20 fuses with a capacity of 100 amps at 12 volts D.C.

* * * * *